United States Patent [19]

Kummeling et al.

[11] 4,320,647

[45] Mar. 23, 1982

[54] METHOD OF AND APPARATUS FOR MAKING ELEMENTS WITH PROFILED CROSS-SECTION FROM SHEET METAL

[75] Inventors: Jozef W. M. Kummeling, Leende; Hermanus A. C. Holweg, Rosmalen, both of Netherlands

[73] Assignee: Volvo Car B.V., Helmond, Netherlands

[21] Appl. No.: 123,058

[22] Filed: Feb. 20, 1980

[30] Foreign Application Priority Data

Feb. 22, 1979 [NL] Netherlands ............................ 7901424

[51] Int. Cl.³ ...................... B21B 15/00; B21B 27/02; B26F 1/40
[52] U.S. Cl. ...................................... 72/203; 72/199; 72/334; 72/338; 83/33; 83/367
[58] Field of Search ................... 72/203, 185, 129-132, 72/206, 334, 338, 199; 83/33, 367

[56] References Cited

U.S. PATENT DOCUMENTS

| | | | |
|---|---|---|---|
| 419,344 | 1/1890 | Nauman | 72/129 |
| 2,232,071 | 2/1941 | Laystrom | 83/33 X |

*Primary Examiner*—Milton S. Mehr
*Attorney, Agent, or Firm*—Haseltine and Lake

[57] ABSTRACT

A method of making elements with profiled cross-section from sheet metal for use in a driving belt by a rolling process, for providing a strip with a middle groove in longitudinal direction and by rolling the material continuously symmetrically with respect to that groove to two profiles punching out the elements on both sides of the middle groove, with their longitudinal direction in the direction of movement of the strip, according to lines which are located at accurately predetermined distances on both sides of the groove.

5 Claims, 6 Drawing Figures

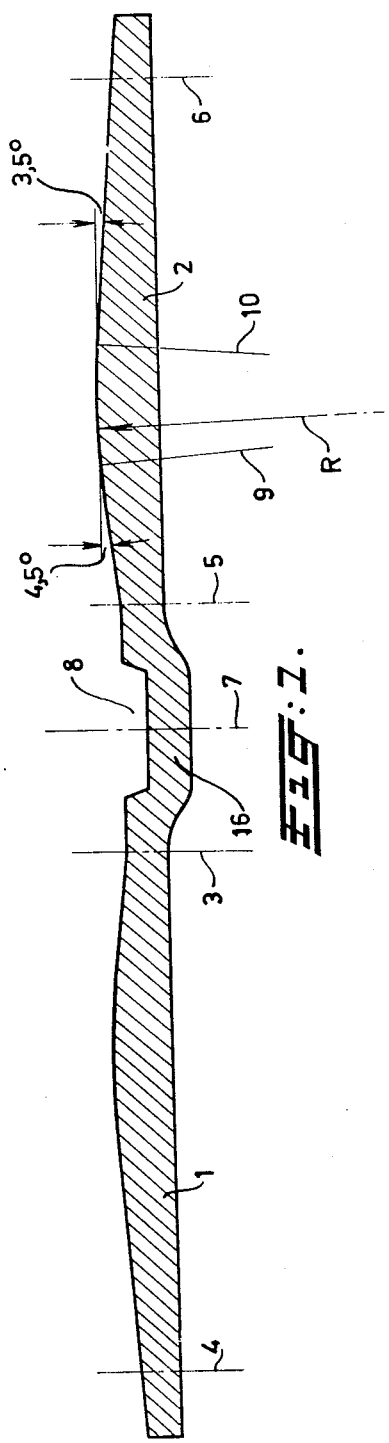

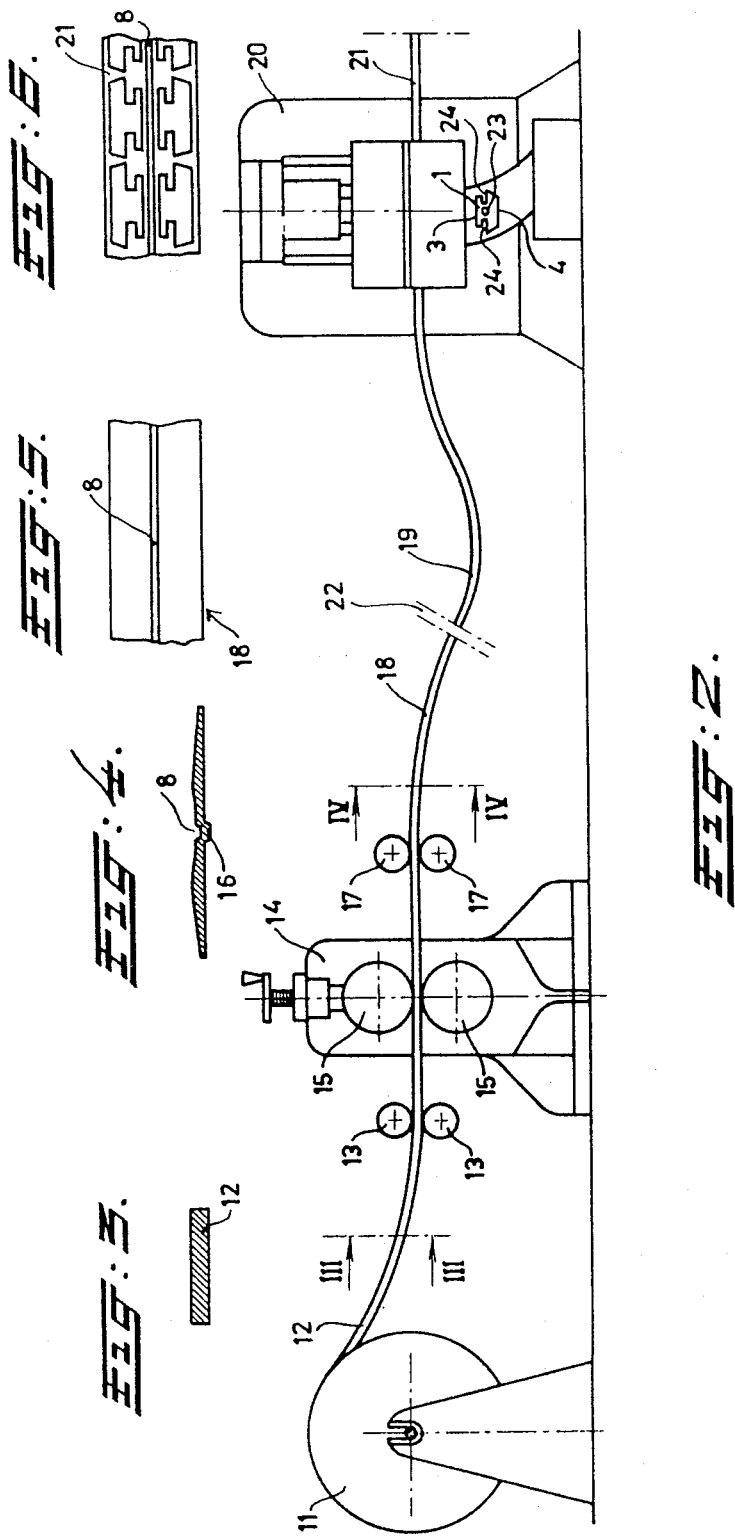

METHOD OF AND APPARATUS FOR MAKING ELEMENTS WITH PROFILED CROSS-SECTION FROM SHEET METAL

BACKGROUND OF THE INVENTION

1. Field of the Invention

The present invention relates to a method of making elements with profiled cross-section from sheet metal and more particularly to plate elements suitable for use as transverse elements for transmitting power in a driving belt on which the elements are arranged in a series next to and against each other running between cone pulleys.

2. Description of the Prior Art

In the prior art elements for transmitting a driving belt have been used. Such elements must meet the demand that the cross-section thereof be uniform on the whole length of the element, that the dimensions come up to the prescribed values with a very small limit and that the surface has good contact properties and a close structure. Very high demands are made to the uniformity of the surface profile so as to ensure that a driving belt composed of similar elements shows a high efficiency and a noiseless running.

Efforts have been made to produce the plates by shaping a metal strip in such a way that the cross-section has continuously the desired profile of plates to be punched thereout afterwards but said efforts have not led to acceptable results, more particularly not since, when drawing the profile ate reasonable production speed, irregularities arise and a satisfactorily planned parallelism of the bent surface cannot be obtained.

German Offenlegungsschrift No. 2,533,280, entitled "Hinge profile and method and apparatus for the manufacture of hinge plates, issued on Feb. 2, 1977 to Ed. Scharwächter, teaches a method of making profiled objects, according to which on both sides of a center line two symmetric elements are rolled and separated from each other along the center line. The difficulty with this method is that it is used for the manufacture of hinge plates with respect to which no high demands are made concerning the exactness and quality of the surface.

The insight to manufacture elements for driving belts, which elements have to meet very specific demands, is not to be derived from this publication and neither the punching at accurately preset distances with respect to the connection between the profiles.

U.S. Pat. No. 3,949,621, issued to Bernard Joseph Beusink et al (deceased) on Apr. 13, 1976, entitled "Endless belt with trapezoidal section constituted by supporting members" teaches an uninterrupted row of thin metal plates transversely mounted on a metallic pull band over the entire length thereof. The plates are pressed against each other by tensile stress in the pull band. The alignment of each plate in a plane perpendicular to the longitudinal direction of the band is maintained by coupling means between all contiguous plates preventing lateral shifting of each plate with respect to its adjointing plates but allowing a slight mutual tipping of the plates around an axis perpendicular to the longitudinal direction of the pull band and parallel to the plane thereof. The difficulty with these plates or elements is that their manufacture requires an expensive after treatment after the punching, shaping the desired profile and obtaining the desired dimensions.

SUMMARY OF THE INVENTION

In view of the foregoing factors and conditions of the prior art it is a primary object of the present invention to provide a method resulting in plates which meet the demands to be made to them and which allows a high production speed, resulting in a high output.

It is another object of the present invention to provide a rolling lane line in which a metal strip is supplied to a rolling device of which the rolls are provided on the one side with a circular edge around the circumference and on the other side with a matching groove, while the surface of one of the rolls, symmetrically to both sides thereof, comprises a circular recess, running around the roll and corresponding to the curved surfaces to be formed on the strip, the strip being then guided through a punching press which is adapted to punching uniform elements on both sides of the groove made in the strip (and according to lines located on both sides of the groove at accurately preset distances), the punching press comprising guides for the strip interlocking with said groove, and also a stamp for impressing a cam in the center line of each element punched, this stamp corresponding with the impression made on the side of the element.

It is still another object of the present invention to provide elements with a curved surface unrolling against each other, made by performing the method according to any of the foregoing aspects.

In a preferred embodiment a steel strip is provided in a rolling process with a middle groove running in longitudinal direction of the strip, while, on both sides thereof the material is rolled symmetrically with respect to this groove to two profiles, each of which having continuously in longitudinal direction the cross-section of the elements to be shaped while after this shaping the strip is guided through a punching press which, on both sides of the middle groove, punches elements of which the longitudinal direction lies in the direction of movement of the strip, the punching being done according to lines running in longitudinal direction, these lines being located at accurately preset distances on both sides of the groove.

The rolling process ensures that the cross-section of all of the elements punched from the rolled strip have exactly the desired shape, while the fact that the punching of the elements is done exactly in preset positions ensures that all of the elements possess exactly the same dimensions. Because of a rolling process a favorable surface structure is obtained which may still be improved by a hardening process, if necessary.

In the punching press the stamp preferably makes an impression in a symmetric center line on one side of the elements, the displaced material forming a cam on the other side such that impressions and cams of the elements will form interlocking couplings between elements which are arranged next to and lie against each other.

Preferably, the method is so carried out that the profile on both sides of the middle groove is rolled with a curved surface, of which the highest point in the cross-section in which the curvature of the profile reverses, is located at about ⅔ of the height of the elements to be punched out of the strip.

Preferably, at the location of reversal the curvature is rolled with a radius of about 20 to 35 mm for a height of a plate to be punched of about 13 mm.

With the method according to the invention a very high exactness may be achieved. In actual practice it has been found that in the length direction of a plate-shaped element with a length of 27 mm an exactness of the profile, thus a parallelism, better than $1\mu$ may be realized, while the dimensions transversely on the longitudinal axis are obtained with an accuracy of better than 0.05 mm.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is a cross-section on a enlarged scale of a strip to be formed from which plates of the required shape may be punched in a simple manner;

FIG. 2 is a schematic illustration of a rolling lane suitable for shaping this profile by means of an additional punching press for punching the plates;

FIG. 3 is a cross-section on an enlarged scale of the initial strips according to line III—III in FIG. 2;

FIG. 4 is a similar cross-section according to line IV—IV in FIG. 2, after the strip has passed through the rolling device;

FIG. 5 is a top view belonging to FIG. 4; and

FIG. 6 is a similar top view of the waste-strip after the plates have been punched out of it.

DESCRIPTION OF A PREFERRED EMBODIMENT

In order to best understand the present invention a description of preferred embodiments thereof is provided accompanied by drawings. The cross-section of a profile strip which has undergone the rolling process according to the invention and before plates are punched out of it, is shown in FIG. 4. The plates 1 and 2 may be punched out of it according to the cutting lines 3, 4 and 5, 6 resp., for upper and lower edges. It can be seen that the bottom of the plates is kept flat whereas the upper face is curved. The plates to be punched are mirror-images and because both halves of the profile are located symmetrically with respect to a center line 7, the punching on both sides should be carried out at exactly equal distances from the center line 7 so as to obtain perfectly uniform plates. For this purpose, the groove 8 made in the centre constitutes a guide with respect to guide means for the profile strip interlocking in that groove 8 and has furthermore an additional use as will be explained hereafter. For the example shown, the size of a plate between the lines 5 and 6 may be 13 mm, for instance, while the thickness at the top of the curve may be 2 mm.

It can be seen that the curve as indicated in the right-hand portion of FIG. 1 shows a curvature on the surface between the perpendicular lines 9 and 10 which may have a radius R of about 20 to 35 mm, and in this area the curve reverses, in other words, the upper face of the plate to be punched out slopes down from the said area toward the edges 5 and 6 in the direction of the bottom. These slopes may be about straight lines, for the first portion with a slope of 4.5° and for the latter portion with a slope of 3.5° with respect to the bottom face.

The highest zone of curvature between the lines 9 and 10 is located at about ⅔ of the height of the plate to be punched, seen from the bottom thereof.

In order to obtain a profile of this cross-section very accurately, a rolling process as explained in FIGS. 2–6 is applied. On a supply roll 11 is wound a metal starting strip 12 of which the diameter is shown in FIG. 3. Between guide rolls 13 which according to their surface configuration may be carried out as control or guide rolls, this strip is guided to a rolling device 14. This device is provided with rolls 15, one of which is provided with a circular edge running around the circumference and the other with matching groove. Thereby a groove 8 is rolled into the profile, as can be seen in FIGS. 1, 4 and 5. The surface of one of the rolls is provided on both sides of said edge with recesses located symmetrically with respect to each other, these recesses being formed around the roll circularly and being shaped in such a manner that they constitute the curved surfaces of the strip on both sides of the groove 8, as illustrated in FIGS. 1 and 4. Deformation of the strip material between the rolls 15 causes not only displacement of some material in longitudinal direction but also a sidewise displacement of the material, and the simultaneous formation of the groove 8 is of great importance for giving the material a sufficient opportunity of displacement toward the portion 16 of the profile pressed out below the groove. On the outlet side of the rolling device 14 is arranged a set of customary rolls 17 and from here the strip 18, which in cross-section now has the configuration according to FIGS. 1 and 4 and in plan view the configuration according to FIG. 5, is guided in a curve 19 to the punching press 20.

So as to obtain the narrow limits within which the manufacture is carried out, said punching press is a so-called precision punching press.

The waste strip 21 which leaves the punching press 20, as illustrated in FIG. 6, shows the shape in which the desired plates are punched out. In the punching press the groove 8 forms, as already stated, a guide groove, so that each time two plates can be punched out simultaneously on both sides of that groove at exactly equal distance from the center line 7 already mentioned in connection with FIG. 1. Due to the fact that the strip 18 forms a double profile for plates to be punched out, a high production is obtained, while maintaining the desired exactness. Nevertheless, generally the running speed of the profile through the rolls 15 will be higher than the production speed of the punching press 20. Should said running speed be adapted to the production capacity of a single punching press 20, then the sagging curve 19 serves as a stock of material in order to be able to follow the step-by-step movement of the punching press by a continuous supply of profile strip 18.

At numeral 22 there is shown an interruption in the strip in order to indicate that at a production speed of roll 14 which is higher than that of punching press 20, the material can be stored here on rolls, which rolls are then used for feeding two or more punching presses.

From FIG. 2 it can also be seen how punched-out plates 2 leave the punching press on the one side, while each time a simultaneously punched-out plate is carried off on the other side.

In a preferred embodiment the punching press is also provided with a stamping device which makes an impression 23 on the one side of each plate resulting in a cam to be pressed out on the other side of the plate, to wit in the center line of each punched-out element. The sidewise notches 24 resulting from the punching of the plates, act as a surface for supporting the driving belt, which is split up into two strips, on which the elements 4 are arranged.

The rolling process described is used, for instance, with material with a thickness of 2.0 to 3.5 mm. Particularly in the case of thicknesses of over 2.0 mm the material is notably stretched as a result of rolling.

As described hereinbefore, the middle groove 8 is a line of reference which allows the punching of perfectly uniform plates on both sides of this line, but the middle groove 8 also serves as a deformation groove for giving way to displaced material. The invention will be set out with particularity in the appended claims.

What is claimed is:

1. A method of making elements with profiled cross-section of sheet metal, more particularly plate elements having cams for transmitting power in a driving belt on which the elements are arranged in series next to and against each other running between cone pulleys, including the steps of: providing a steel strip in a rolling process with a middle groove running in longitudinal direction of the strip, continuously rolling said strip on both sides in a symmetrical fashion with respect to that groove to form two profiles, each of which having continuously in longitudinal direction the cross-section of the elements to be shaped; guiding said shaped strip through a punching press for punching out elements on both sides of the middle groove, of which a longitudinal direction lies in the direction of movement of the strip, and providing lines running in longitudinal direction located at accurately predetermined distances on both sides of the groove to guide said punching.

2. A method according to claim 1, employing the steps of: forming impressions by stamping with a punching press along a symmetric center line on one side of the elements such, that said impressions and said cams of the elements form interlocking couplings between said elements which are disposed next to and against each other.

3. A method according to either claim 1 or 2, including the steps of: rolling both sides of the middle groove causing the profile to be rolled with a curved surface of which the highest point in the cross-section, in which the curvature of the profile reverses, is located at $\frac{2}{3}$ of the height of the elements to be punched out of the strip.

4. A method according to claim 3, including the steps of: rolling the curvature on the point of reversal with a radius of about 20 to 35 mm for a height of a plate, to be punched out of about 13 mm.

5. A rolling line for making profiled elements of sheet metal: comprising a pair of rolls having symmetrically curved surfaces and groove forming means, whereby a locating groove and a symmetrically profiled shape on each side thereof are formed; a punch press and guide means therefor, whereby uniform elements on both sides of the groove made in the strip, according to lines located at accurately preset distances on both sides of the groove are stamped.

* * * * *